United States Patent [19]

Sado

[11] 4,247,902

[45] Jan. 27, 1981

[54] DISPLAY FOR ELECTRONIC CALCULATOR

[75] Inventor: Ichiro Sado, Tokyo, Japan

[73] Assignee: Canon Kabushiki Kaisha, Tokyo, Japan

[21] Appl. No.: 18,634

[22] Filed: Mar. 8, 1979

[30] Foreign Application Priority Data

Mar. 9, 1978 [JP] Japan .............................. 53-27053

[51] Int. Cl.[3] .............................................. G06F 3/14

[52] U.S. Cl. ...................................... 364/710; 364/715

[58] Field of Search ................. 364/710, 715; 340/756

[56] References Cited

U.S. PATENT DOCUMENTS

| | | | |
|---|---|---|---|
| 4,040,048 | 8/1977 | Lien | 364/710 X |
| 4,101,962 | 7/1978 | Hakata | 364/710 X |
| 4,138,734 | 2/1979 | Nakata et al. | 364/710 |

*Primary Examiner*—Jerry Smith

*Attorney, Agent, or Firm*—Fitzpatrick, Cella, Harper & Scinto

[57] ABSTRACT

A display device for use in electronic calculators capable of displaying determinants. The display device is able to display data of positions in row and in column of elements in a determinant together with numbers associated with the elements. The data of positions in row and column is displayed as selective segments of a figure "8" pattern.

2 Claims, 3 Drawing Figures

$$D = \begin{vmatrix} 1.2 & 3.0 & 4.5 \\ 6.7 & 8.9 & 0.1 \\ 2.3 & 4.0 & 5.6 \end{vmatrix}$$

| ROWS | COLUMNS | SYMBOLS | NUMBERS |
|---|---|---|---|
| 1 | 1 |  | 1.2 |
| 1 | 2 |  | 3.0 |
| 1 | 3 |  | 4.5 |
| 2 | 1 |  | 6.7 |
| 2 | 2 |  | 8.9 |
| 2 | 3 |  | 0.1 |
| 3 | 1 |  | 2.3 |
| 3 | 2 |  | 4.0 |
| 3 | 3 |  | 5.6 |

→ DISPLAY DS ←

⇓

| ROWS \ COLUMNS | 1 | 2 | 3 |
|---|---|---|---|
| 1 | A F E | A | A B C |
| 2 | F G E | G | G B C |
| 3 | F E D | D | B C D |

DISPLAY FOR ELECTRONIC CALCULATOR

BACKGROUND OF THE INVENTION

1. Field of the Invention

The present invention relates to a display device for use in electronic calculators.

2. Description of the Prior Art

With rapid development of electronic techniques in these years, the operational functions which electronic calculators accomplish have been increased more and more in kind and number. For example, there have been provided functional calculators which are able to handle quadratic equations, complex numbers, matrices and others.

However, inexpensive and simple display devices now available have only a limited capacity of display and cannot accomodate themselves to such increase in the functions of calculators. This has resulted in calculators which are very hard and troublesome to handle. As an example, mention can be made of computing a determinant. In conventional calculators capable of calculating determinants, when a number is being displayed, it remains unknown to the operator in which row and in which column the number is. Therefore, he cannot know which row and column should become the next input.

SUMMARY OF THE INVENTION

Accordingly, it is a general object of the present invention to provide an improved display device for use in electronic calculators which eliminates the above mentioned inconvenience.

It is a specific object of the invention to provide a display device which is able to display information of positions in row and column of elements in a determinant together with numbers associated with the elements.

Other and further objects, features and advantages of the invention will be understood more fully from the following description taken in connection with the accompanying drawing wherein:

FIGS. 1 and 2 show explanatorily an example of display according to an embodiment of the present invention; and FIG. 3 is a schematic block diagram of the embodiment.

DETAILED DESCRIPTION OF THE PREFERRED EMBODIMENT

Figure 1:
Figure 1:
Figure 1:
Figure 1:
Figure 1:
Figure 1:
Figure 2:
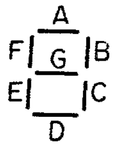

In FIGS. 1 and 2, there is shown, as an example, a determinant D in three rows and three columns displayed in given order. The number in row 1 and column 1 of determinant D is shown 1.2. When the number 1.2 is displayed, a symbol "⌈" is also visualized in the leftwardmost digit position of the display device to give an indication of the position in row and column of the number 1.2. Therefore, the operator can learn the element position of the number in the determinant. As illustrated in the drawing, the symbol to suggest the position in row 2 and column 2 is "-". This symbol is the same as that conventionally used to mean "negative". Therefore, one may mistake the symbol for the negative sign. If it is desired to prevent such a mistake, then the suggestion of the position in row 2 and column 2 can be made by displaying no symbol for the position of that element. The last number in the determinant D is 5.6. The data of 5.6 is displayed together with the symbol "_|", from which the operator can uderstand that the number 5.6 then shown is in row 3 and column 3.

Figure 3:
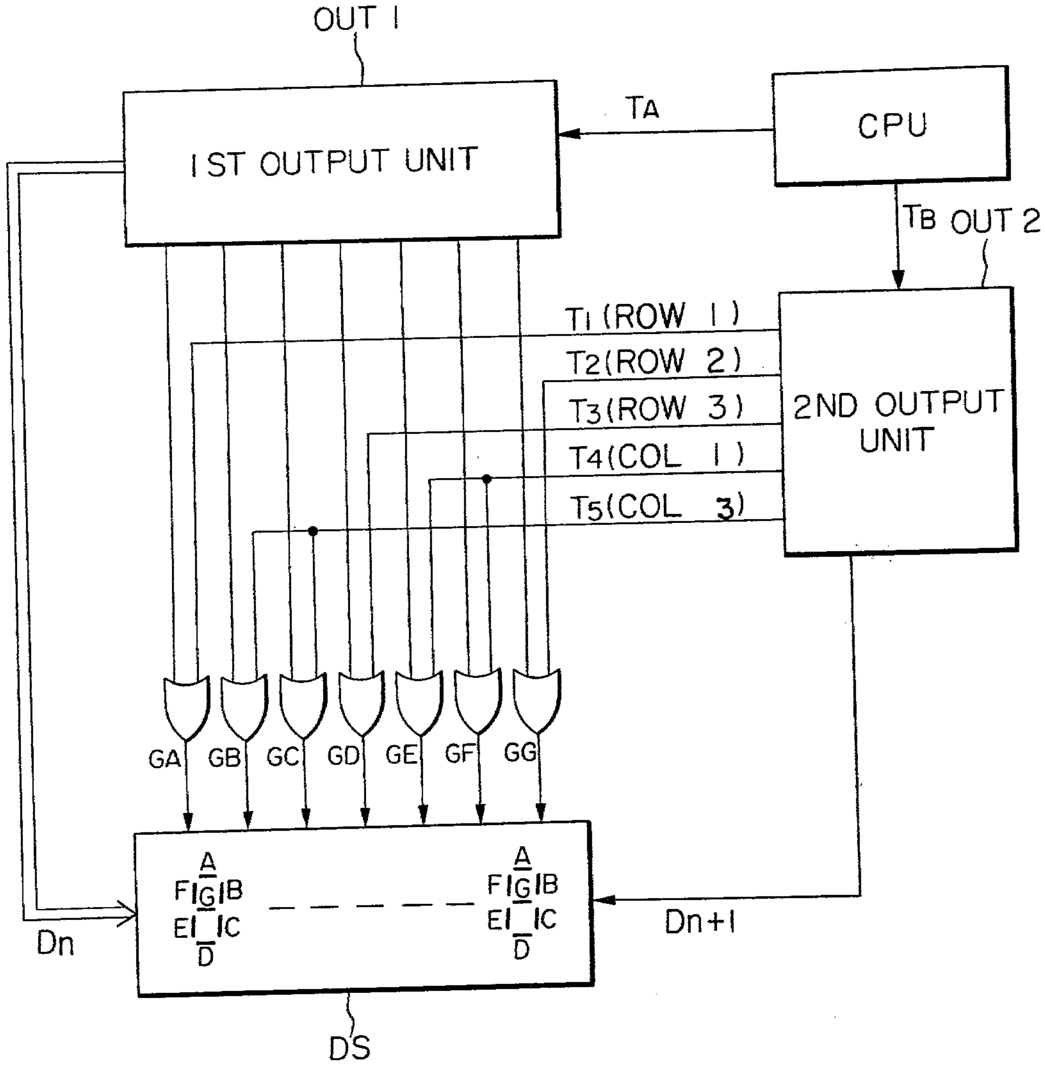

An example of circuit configuration used to obtain the display symbols shown in FIGS. 1 and 2 is schematically illustrated in FIG. 3.

In FIG. 3, CPU designates a central processor unit, OUT 1 a first output unit and OUT 2 a second output unit. The first output unit receives from the CPU a data $T_A$ necessary for display and carries out position controlled time division display driving. The second output unit receives from the CPU a row and column data relating to display and produces outputs $T_1$, $T_2$, $T_3$, $T_4$ and $T_5$ shown in FIG. 3 through flip-flops, decoders etc. which are provided in the second output unit OUT 2. Signals from the first and second output units OUT 1 and OUT 2, respectively, are combined via OR gates GA, GB, GC, GD, GE, GF and GG, from which the resultant signals are introduced into a display unit DS. Designated by Dn is an nth digit position driving pulse formed in OUT 1, and Dn+1 a digit position timing pulse formed in OUT 2. The latter mentioned pulse is to be added to a certain digit position and is developed from OUT 2 subsequent to the signals $T_1$–$T_5$.

The display unit DS is formed as multidigit display having a pattern of the Figure "8". As previously noted, one of the digit positions is connected to display specific symbols. Suffixes A–G of the OR gates GA–GG used in the drawing suggest the wiring between the gates and the segments A–G of the digit display "8".

Assuming that now the data 2.3 in row 3 and column 1 is to be introduced into OUT 1 from the CPU through lead $T_A$, then a binary code standing for the element position in row 3 and column 1 will be introduced into OUT 2 through connection $T_B$ and, at a given display timing, will be applied to the display unit DS. In this manner, there is obtained an indication of L2.3.

While explanation has been particularly made of a determinant of three rows and three columns, it will be easily understood from the foregoing that generally a determinant comprising rows and n columns can be displayed in the same manner by using the top segment for the first row, the bottom segment for the mth row, the left-hand segment for the first column and the right-hand segment for the nth column in making display symbols.

Also, the present invention is applicable to a display according to a dot matrix display system, which can be realized without difficulty according to the above described principle of the invention.

As will be understood by those skilled in the art, the present invention brings forth particular operative effects and advantages when it is required to successively display, on a display device having a limited number of digit positions, numbers which are disposed in a two-dimentional space.

What I claim is:

1. A display device for use in electronic calculators comprising:
   - first display means for displaying numerical data of a determinant; and
   - second display means for displaying data of a position in row and in column of the determinant associated with the numerical data.

2. A display device in accordance with claim 1, wherein each of said first and second display means comprises a group electrodes which are disposed as a pattern of the figure "8", said electrodes being selectively energized to display the numerical data of a determinant and the data of a position associated therewith.

* * * * *

UNITED STATES PATENT AND TRADEMARK OFFICE

CERTIFICATE OF CORRECTION

PATENT NO. : 4,247,902

DATED : January 27, 1981

INVENTOR(S) : Ichiro Sado

It is certified that error appears in the above-identified patent and that said Letters Patent are hereby corrected as shown below:

column 2, line 40, after "comprising" insert --m--.

Signed and Sealed this

*Twenty-eighth* Day of *April 1981*

[SEAL]

*Attest:*

RENE D. TEGTMEYER

*Attesting Officer* *Acting Commissioner of Patents and Trademarks*